(12) United States Patent
Araki et al.

(10) Patent No.: US 7,170,209 B2
(45) Date of Patent: Jan. 30, 2007

(54) ROTOR FOR RELUCTANCE TYPE ROTATING MACHINE

(75) Inventors: Takashi Araki, Yokkaichi (JP); Masakatsu Matsubara, Mie-gun (JP); Motoyasu Mochizuki, Ama-gun (JP); Yukihiko Kazao, Yokohama (JP); Masanori Arata, Yokohama (JP); Yasuo Hirano, Kuwana (JP); Nobutake Aikura, Yokkaichi (JP); Akito Kondou, Inabe-gun (JP); Masahiko Yamashiki, Tsu (JP); Masanori Ohashi, Tokyo (JP); Takashi Hanai, Nagoya (JP)

(73) Assignees: Kabushiki Kaisha Toshiba, Tokyo (JP); Toshiba Industrial Products Manufacturing Corporation, Mie-gun (JP)

( * ) Notice: Subject to any disclaimer, the term of this patent is extended or adjusted under 35 U.S.C. 154(b) by 0 days.

(21) Appl. No.: 10/833,095

(22) Filed: Apr. 28, 2004

(65) Prior Publication Data

US 2005/0023922 A1 Feb. 3, 2005

(30) Foreign Application Priority Data

Jul. 31, 2003 (JP) ............................. 2003-204863

(51) Int. Cl.
*H02K 21/12* (2006.01)
*H02K 1/27* (2006.01)
*H02K 15/05* (2006.01)

(52) U.S. Cl. ........................... 310/156.47; 310/156.53; 310/156.09; 29/598

(58) Field of Classification Search ................ 310/168, 310/156.47, 156.53, 217, 156.09, 156.51; 29/598

See application file for complete search history.

(56) References Cited

U.S. PATENT DOCUMENTS

| 5,760,520 | A | * | 6/1998 | Hasebe et al. | ............... | 310/261 |
| 5,936,323 | A | * | 8/1999 | Shibukawa et al. | ..... | 310/156.53 |
| 2002/0047431 | A1 | * | 4/2002 | Fukushima | ............ | 310/156.47 |
| 2002/0117933 | A1 | * | 8/2002 | Joong et al. | ................. | 310/261 |
| 2004/0130236 | A1 | * | 7/2004 | Yonekura | ..................... | 310/254 |
| 2004/0207280 | A1 | * | 10/2004 | Luo et al. | .............. | 310/156.47 |
| 2004/0232794 | A1 | * | 11/2004 | Hsu | ....................... | 310/156.56 |
| 2004/0245880 | A1 | * | 12/2004 | Liang | .................... | 310/156.47 |
| 2005/0104468 | A1 | * | 5/2005 | Araki et al. | ........... | 310/156.53 |

FOREIGN PATENT DOCUMENTS

JP 2003009483 A * 1/2003

* cited by examiner

*Primary Examiner*—Darren Schuberg
*Assistant Examiner*—Erik Preston
(74) *Attorney, Agent, or Firm*—Oblon, Spivak, McClelland, Maier & Neustadt, P.C.

(57) ABSTRACT

A rotor for a reluctance type rotating machine includes a rotor core formed by stacking a number of annular core materials each of which includes magnetic concave and convex portions. The rotor core has two keys which are formed at two positions on an inner circumference of the rotor core. The positions are spaced 180 degrees apart from each other with respect to the rotor core. The rotor core is divided into a plurality of blocks and the core materials constituting at least one block have the magnetic concave and convex portions shifted by a predetermined angle relative to the core materials constituting the other or another block on the basis of a center line passing through the keys. A whole or part of the core materials of at least one block are located circumferentially 180 degrees apart form the core materials constituting the other or another block.

8 Claims, 12 Drawing Sheets

ROTOR FOR RELUCTANCE TYPE ROTATING MACHINE

BACKGROUND OF THE INVENTION

1. Field of the Invention

This invention relates to a rotor for a reluctance type electric rotating machine which can achieve the similar effects to those achieved by skew.

2. Description of the Related Art

A reluctance type rotating machine or, for example, a reluctance type rotating machine provided with permanent magnets includes a rotor formed with a magnetic convex portion where a flux is easy to pass (d axis) and a magnetic concave portion where a flux is difficult to pass (q axis) and a permanent magnet which is disposed in a stator provided with a stator winding. The magnetic convex portion (d axis) has a high magnetic flux density in an air gap, whereas the magnetic concave portion (q axis) has a low magnetic flux density in an air gap. These variations in the magnetic flux density produce reluctance torque. Furthermore, torque is also developed by a magnetic attractive force and a magnetic repulsive force between poles of the permanent magnet and stator.

FIGS. 16 and 17 illustrate an example of conventional rotor for a reluctance type rotating machine with permanent magnets. The illustrated machine is an 8-pole machine. FIG. 16 is a side view of the rotor with an end plate and a rotational shaft being eliminated. FIG. 17 is a sectional view taken along line 17—17. Referring to FIG. 16, the rotor 100 includes a rotor core 101 made by stacking a number of annular silicon steel sheets. The rotor core 101 has pairs of generally rectangular magnet insertion holes 102 formed in an outer circumference thereof as shown in FIG. 17. Permanent magnets 103 are inserted and fixed in the insertion holes 102 respectively. The outer circumference of the rotor core 101 is further formed with cavities 104 located between the respective pairs of permanent magnets 103 as shown in FIG. 17. Each cavity 104 is formed into a generally triangular shape. In the rotor 100, each pair of insertion holes 102, permanent magnets 103 and each cavity 104 constitute the aforesaid magnetic concave portion 105 where a flux is difficult to pass (q axis). Each portion between the concave portions 105 constitutes the aforesaid magnetic convex portion 106 where a flux is easy to pass (d axis). The magnetic concave and convex portions 105 and 106 are formed alternately with a predetermined angle therebetween. See JP-A-2001-339922, for example.

The rotor core 101 has keys 107 formed on an inner circumference thereof. The keys 107 are adapted to engage key grooves of a rotational shaft respectively. Furthermore, a center line Lo passing the keys 107 is adapted to pass the center of the magnetic convex portion 106. A center line La passes the center of the magnetic convex portion 105 adjacent to the center line Lo. The center line Lo is adapted to meet the center line La at an angle θ. The angle θ is at 22.5 degrees when the rotor 100 has 8 poles. The rotor 100 is adapted to be disposed in a stator (not shown) provided with a stator winding.

It is well known that squirrel-cage induction motors result in crawling due to torque developed by high harmonics. There is a possibility that permanent-magnet reluctance type rotating machines as the reluctance type rotating machine may cause the similar crawling to that caused by the squirrel-cage induction motors. As a result, the crawling results in torque ripple, oscillation, vibration and noise.

SUMMARY OF THE INVENTION

Therefore, an object of the present invention is to provide a rotor for a reluctance type rotating machine which can achieve the similar effects to those achieved by skew and reduce torque ripple, oscillation, vibration and noise.

The present invention provides a rotor for a reluctance type rotating machine comprising a rotor core formed by stacking a number of annular core materials each of which includes magnetic concave and convex portions alternately formed on an outer circumference thereof and a central through hole, the rotor core having two keys which are formed at two positions on an inner circumference thereof defining the central through hole of the rotor core so as to extend axially, respectively, the positions being spaced 180 degrees apart from each other with respect to the rotor core, the rotor core being divided into a plurality of blocks, the core materials constituting at least one block having the magnetic concave and convex portions shifted by a predetermined angle relative the core materials constituting the other or another block on the basis of a center line passing through the keys, wherein a whole or part of the core materials of the at least one block are located circumferentially 180 degrees apart from the core materials constituting the other or another block, and a rotational shaft inserted through the central hole of the rotor core, the shaft having two key grooves engaging the keys of the rotor core.

In the above-described construction, the core materials constituting at least one block are formed so that the magnetic concave and convex portions are shifted by a predetermined angle from the core materials constituting the other or another block relative to a center line passing the key. Accordingly, for example, a center line passing the center of the magnetic concave portion of at least one block has a locus shifted from one of another or the other block. Consequently, since the similar effects to those achieved by skew can be achieved, the torque ripple, oscillation, vibration and noise can be reduced.

Each block may include the magnetic concave portions each of which is provided with a pair of magnet insertion holes which are opposed to each other so that a distance therebetween is gradually rendered longer as the insertion holes approach the outer circumference of the rotor, and permanent magnets may be inserted and fixed in the insertion holes respectively.

A magnetic torque by the permanent magnets can also be achieved in addition to reluctance torque. Furthermore, harmonic values of counter electromotive force can be reduced by the similar effects to those achieved by skew.

BRIEF DESCRIPTION OF THE DRAWINGS

Other objects, features and advantages of the present invention will become clear upon reviewing the following description of the embodiments made with reference to the accompanying drawings, in which.

DETAILED DESCRIPTION OF THE INVENTION

Figure 1A:
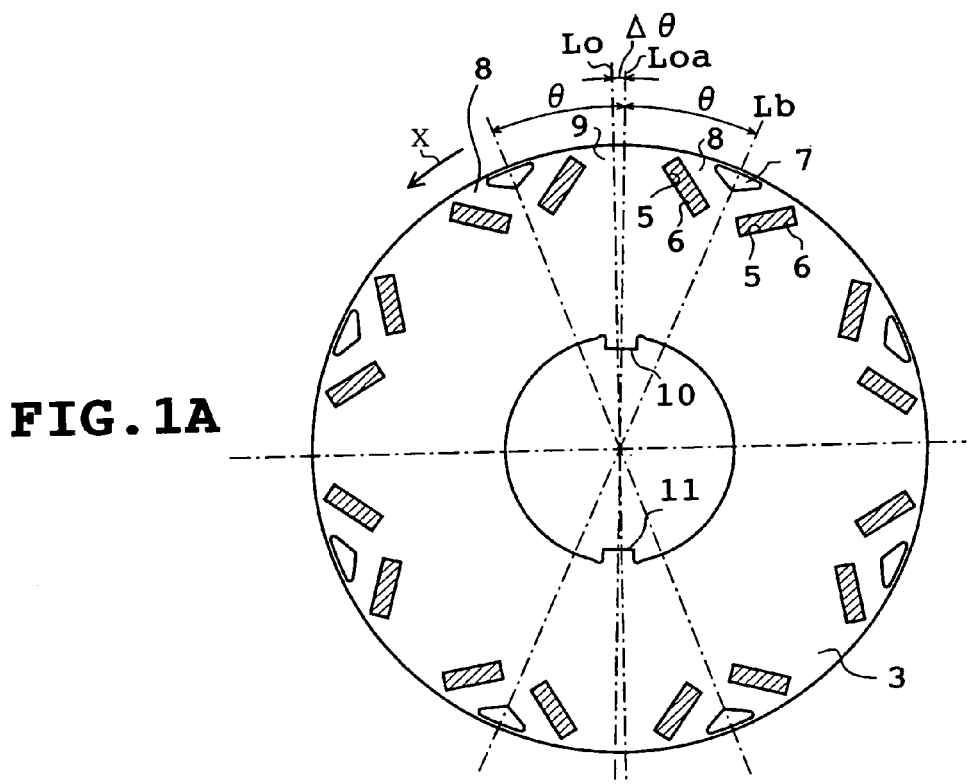
FIGS. 1A and 1B are sectional views taken along lines 1A—1A and 1B—1B in FIG. 2, showing the rotor in accordance with a first embodiment of the present invention.

Several embodiments of the present invention will be described. FIGS. 1A to 5 illustrate a first embodiment in which the invention is applied to a reluctance type rotating machine with permanent magnets. The reluctance type rotating machine possesses eight poles. A rotor 1 of the reluctance type rotating machine includes a rotor core 2 made by stacking a number of annular silicon steel sheets serving as a core material. The rotor core 2 is divided into four blocks 3 and 4 having the same thickness as shown in FIG. 2. The blocks 3 and 4 are stacked alternately.

Each block 3 or the silicon steel sheets composing each block 3 will be described with reference to FIG. 1A. Each block 3 has a number of pairs of generally rectangular magnet insertion holes 5 formed in an outer circumferential portion thereof. The paired magnet insertion holes 5 are opposed to each other so that a distance therebetween is gradually rendered longer as the magnet insertion holes 5 approach an outer circumferential edge. Permanent magnets 6 are inserted into the paired magnet insertion holes 5 respectively and fixed by an adhesive agent, filler or the like. The outer circumferential portion of each block 3 also has cavities 7 formed between the permanent magnets 6 of each pair. Each cavity 7 is formed into a generally triangular shape having two sides parallel to the paired permanent magnets 6 and the other side extending along the outer circumference. The two sides of each cavity 7 may or may not be parallel to the paired permanent magnets 6.

Each block 3 includes each portion thereof corresponding to the paired magnet insertion holes 5, permanent magnets 6 and cavity 7 and serving as a magnetic concave portion 8 (q axis) where a flux is difficult to pass. Each block 3 further includes each portion thereof located between the magnetic concave portion 8 and serving as a magnetic convex portion 9 (d axis) where a flux is easy to pass. The magnetic concave and convex portions 8 and 9 are formed alternately so that each of the magnetic concave and convex portions 8 and 9 meets the other at a predetermined angle. Each block 3 further has two keys 10 and 11 which are formed on the inner circumference thereof so as to be 180-degree apart from each other and so as to extend axially.

A center line Lo passing the centers of the keys 10 and 11 also passes the magnetic convex portions 9 in each block 3. Now, assume a center line Loa shifted from the center line Lo by a predetermined angle $\Delta\theta$ in the direction opposite the direction of rotation of the rotor (clockwise). The center line Loa forms a predetermined angle $\theta$ with a center line Lb passing the center of the magnetic concave portion 8 adjacent to the center line Loa. Accordingly, the center line Loa passes the center of the magnetic convex portion 9. The angle $\theta$ is represented as 180/n when n is the number of poles of the rotor 1. Furthermore, when a stator 50 (see FIG. 5) has slots the number of which is represented as 6×n, the magnetic concave and convex portions 8 and 9 representative of a pole position of each block 3 are shifted by the slot pitch a relative to the center line Lo. Accordingly, the angle $\Delta\theta$ is obtained from:

$$\Delta\theta=(360\times a)/(6\times n)=(60\times a)/n$$

Thus, the angle $\Delta\theta$ is represented as $-(60\times a)/n$ in degree. The minus sign indicates shift in the direction opposite the direction of rotation of the rotor (clockwise).

Each block 4 or the silicon steel sheets composing each block 4 will be described with reference to FIG. 1B. Each block 4 has magnet insertion holes 12 which are similar to the magnet insertion holes 5 and formed in an outer circumferential portion thereof. Permanent magnets 13 are inserted into the paired magnet insertion holes 12 respectively and fixed by an adhesive agent, filler or the like. The outer circumferential portion of each block 4 also has cavities 14 which are similar to the cavities 7 and are formed between the permanent magnets 13 of each pair.

Each block 4 includes each portion thereof corresponding to the paired magnet insertion holes 12, permanent magnets 13 and cavity 14 and serving as a magnetic concave portion 15 (q axis) where a flux is difficult to pass. Each block 4 further includes each portion thereof located between the magnetic concave portion 15 and serving as a magnetic convex portion 16 (d axis) where a flux is easy to pass. The magnetic concave and convex portions 8 and 9 are formed alternately so that each of the magnetic concave and convex portions 8 and 9 meets the other at a predetermined angle. Each block 4 further has two keys 10 and 11 which are formed on the inner circumference thereof so as to be 180-degree apart from each other and so as to extend axially.

A center line Lo passing the centers of the keys 10 and 11 also passes the magnetic convex portions 16 in each block 4. Now, assume a center line Lob shifted from the center line Lo by a predetermined angle $\Delta\theta$ in the rotation direction X of the rotor (counterclockwise). The center line Lob forms a predetermined angle $\theta$ with a center line Lc passing the center of the magnetic concave portion 15 adjacent to the center line Lob. Accordingly, the center line Lob passes the center of the magnetic convex portion 16. The angle $\theta$ is represented as 180/n when n is the number of poles of the rotor 1. The angle $\Delta\theta$ is represented as $+(60\times a)/n$ in degree. The plus sign indicates deviation in the rotation direction X of the rotor (counterclockwise).

Figure 1B:
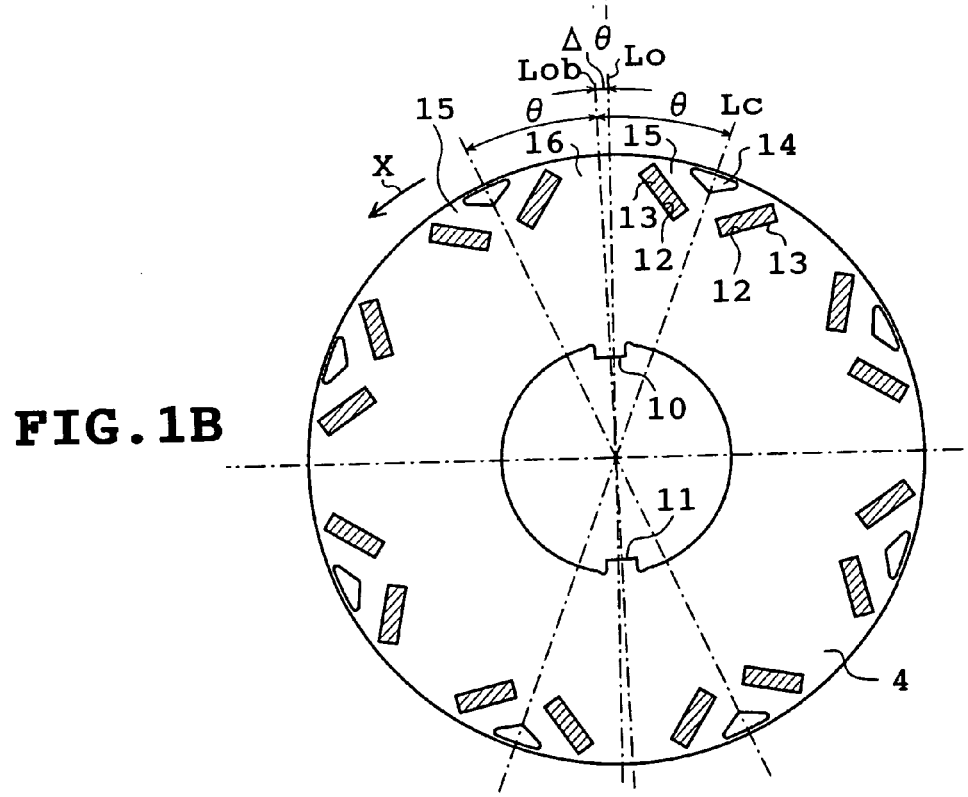
Figure 2:
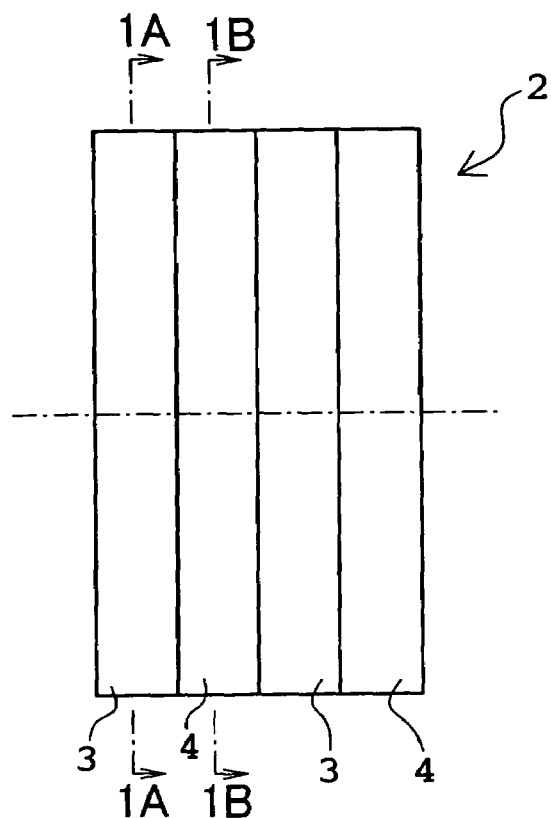
FIG. 2 is a side view of the rotor core of the rotor.
Figure 4:
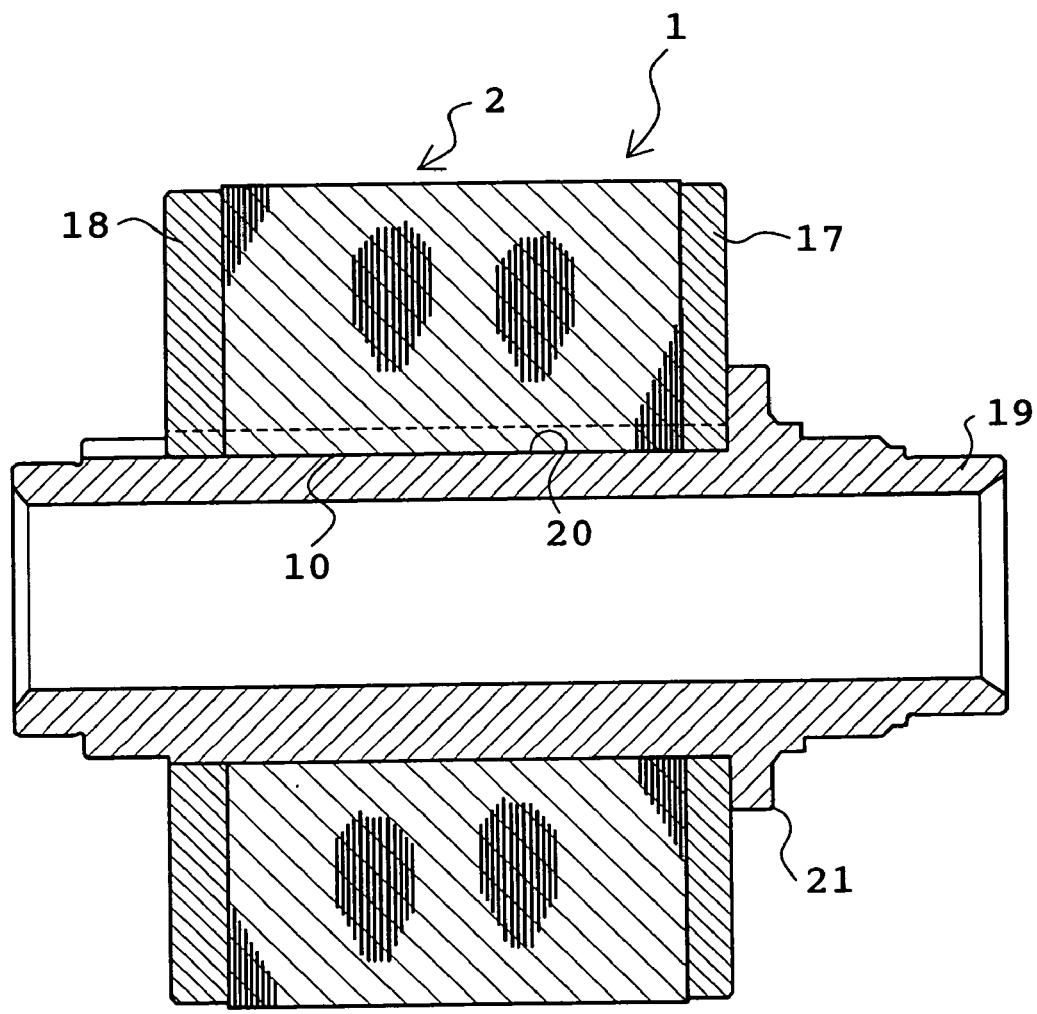
FIG. 4 is a longitudinal section of the rotor.

As obvious from FIGS. 1A and 1B, the block 4 is made by stacking the silicon steel sheets which are the same as those of the block 3 and reversed inside out. Accordingly, the blocks 3 and 4 of the rotor core 2 can be composed of a single type of silicon steel sheets. Two annular end plates 17 and 18 are attached to both ends of the rotor core 2 respectively as shown in FIG. 4.

The rotating shaft 19, rotor core 2 and end plates 17 and 18 are integrated together by shrinkage fitting thereby to be assembled. In this case, as shown in FIG. 4, the keys 10 and 11 of the rotor core 2 are adapted to correspond with key grooves 20 of the rotating shaft 19 respectively. Only one of the key grooves 20 is shown in FIG. 4. The rotating shaft 19 is formed with a flange 21 for positioning the rotor core 2 and end plates 17 and 18.

Figure 3:
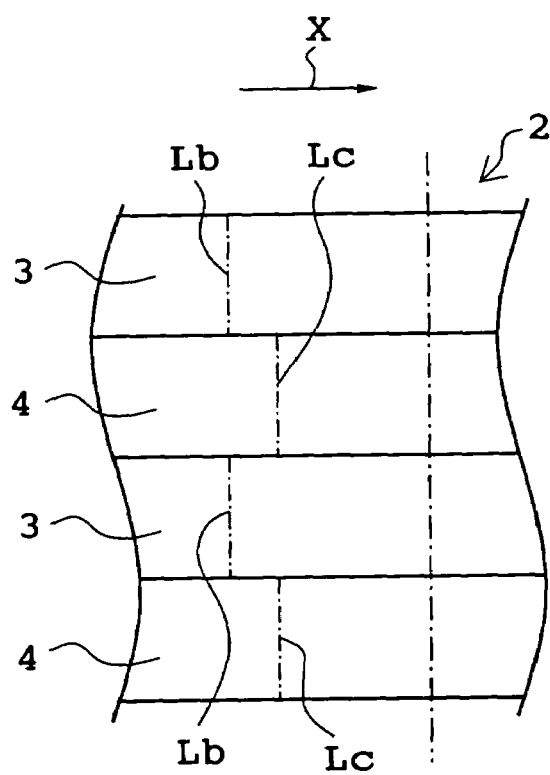
FIG. 3 is a partial plan view of the rotor.

Upon completion of assembly of the rotor 1, the magnetic concave and convex portions 8 and 9 of the block 3 are shifted by the predetermined angle $\Delta\theta$ in the direction opposite the rotation direction X (clockwise) on the basis of the center line Lo. Further, the magnetic concave and convex portions 15 and 16 of the block 4 are also shifted by the predetermined angle $\Delta\theta$ in the rotation direction X (counterclockwise) on the basis of the center line Lo. As a result, the center lines Lb and Lc of the blocks 3 and 4 have linear loci which are zigzagged but not straightforward as in the conventional reluctance type rotating machines, as shown in FIG. 3. Accordingly, the rotor 1 can achieve the effects similar to those of skew in the rotors for squirrel-cage induction motors. In this case, an amount of shift is required to be $\pm 0$ between the center lines Lb and the center lines Lc. More specifically, the sum total of a shift angle $\Delta\theta$ (−) of the center lines Lb and a shift angle $\Delta\theta$ (+) of the center lines Lc is required to be $\pm 0$ and the sum total of loci lengths of the center lines Lb (total thickness of the block 3) is required to be equal to the sum total of loci lengths of the center lines Lc (total thickness of the block 4) or the difference between both sums is required to be $\pm 0$.

Figure 5:
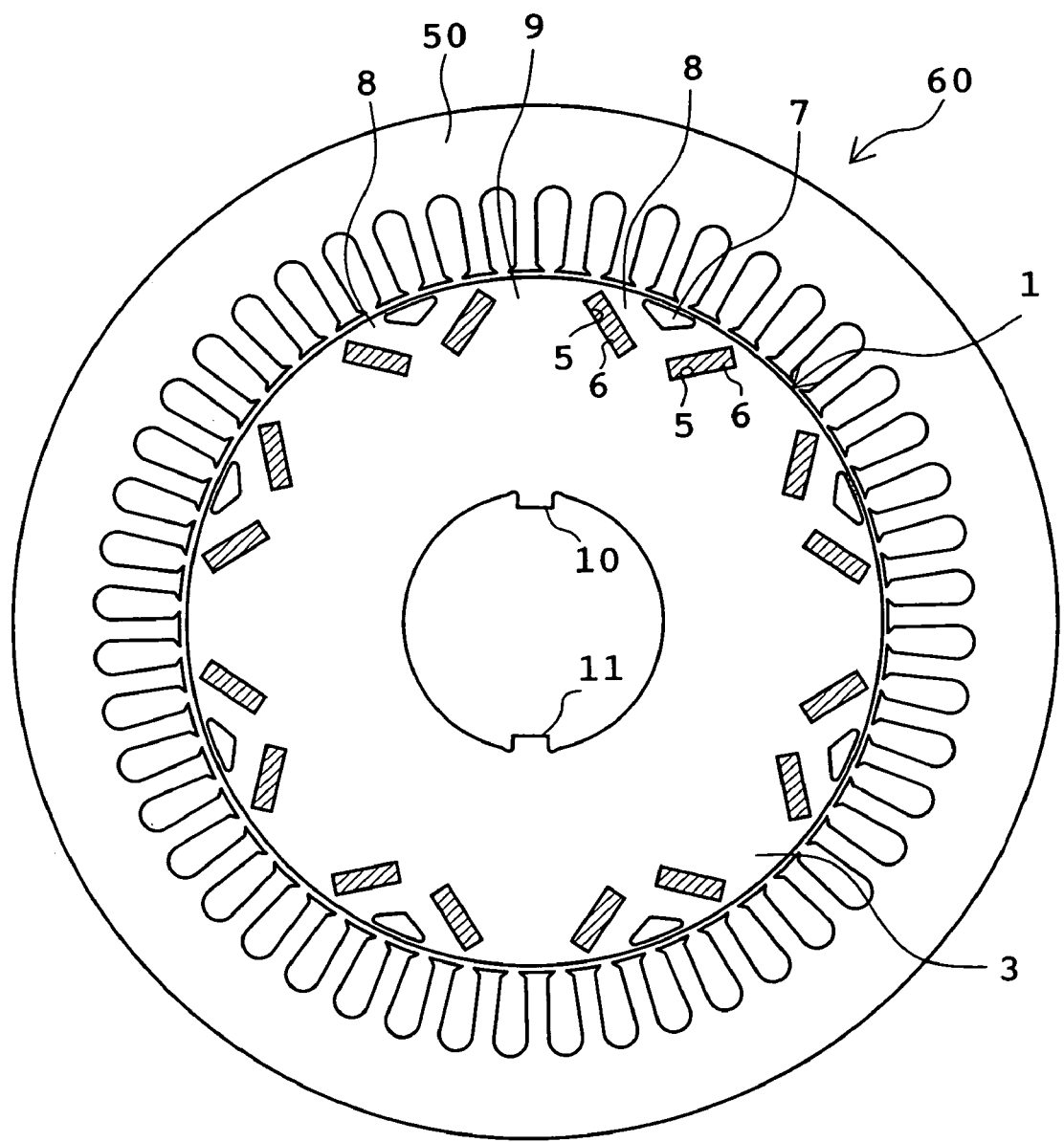
FIG. 5 is a longitudinal section of the reluctance type rotating machine with permanent magnets.

The permanent-magnet reluctance type rotating machine 60 comprises the rotor 1 disposed in the stator provided with stator winding (not shown) as shown in FIG. 5. The rotor 1 includes the magnetic concave portions 8 and 15 (q axis) where a flux is difficult to pass and the magnetic convex portions 9 and 16 (d axis) where a flux is easy to pass. By causing electric current to flow into the stator winding, magnetic energy is stored in air gaps over the magnetic concave and convex portions 8 and 15, and 9 and 16 respectively. The magnetic energy differs from one air gap to another. The changes in the magnetic energy develop reluctance torque. Furthermore, since the rotor 1 is provided with the permanent magnets 6 and 13, torque is also developed by a magnetic attractive force and magnetic repulsive force between the permanent magnets 6 and 13 and magnetic poles of the stator. Consequently, the rotor 1 is rotated.

In the foregoing embodiment, the magnetic concave and convex portions 8 and 9 of the block 3 are shifted by the predetermined angle $\Delta\theta$ in the direction opposite the rotation direction X (clockwise) on the basis of the center line Lo. Further, the magnetic concave and convex portions 15 and 16 of the block 4 are also shifted by the predetermined angle $\Delta\theta$ in the rotation direction X (counterclockwise) on the basis of the center line Lo. As a result, the linear loci of the center lines Lb and Lc of the blocks 3 and 4 are zigzagged and accordingly, the rotor 1 can achieve the effects similar to those of skew in the rotors for squirrel-cage induction motors. Consequently, torque ripple, oscillation, vibration and noise can be reduced in the permanent-magnet reluctance type rotating machine, and a peak value of back electromotive force can be reduced in the stator winding.

Additionally, an amount of shift is set so as to be $\pm 0$ between the center lines Lb and the center lines Lc in the rotor core 2. Consequently, magnetic obstacle can be prevented although the rotor 1 can achieve the effects similar to those of skew in the rotors for squirrel-cage induction motors.

Figure 6:
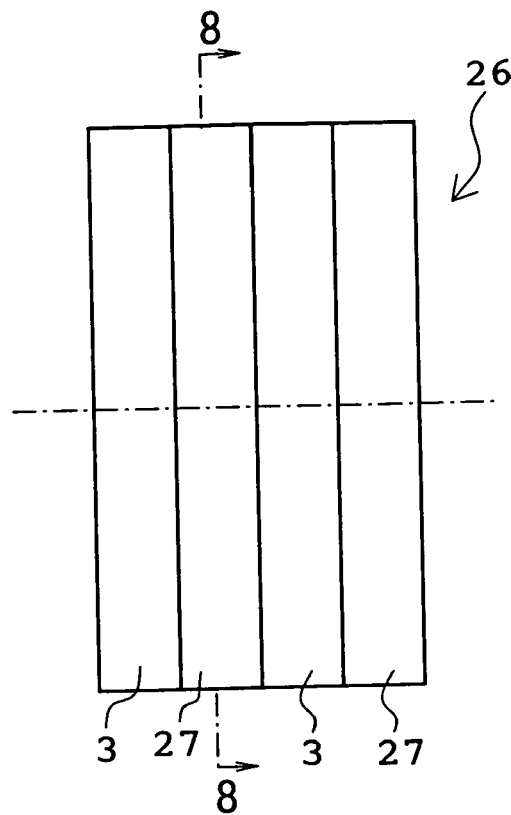
FIG. 6 is a view similar to FIG. 2, showing the rotor in accordance with a second embodiment of the invention.
Figure 7:
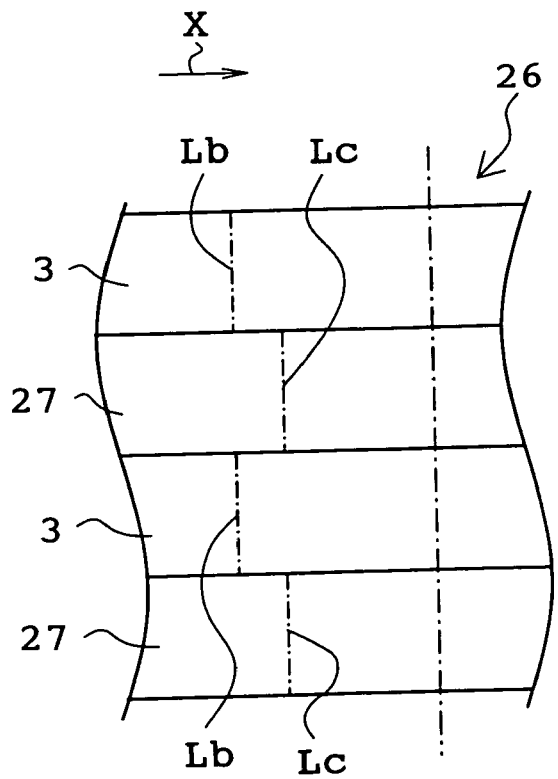
FIG. 7 is a view similar to FIG. 3.
Figure 8:
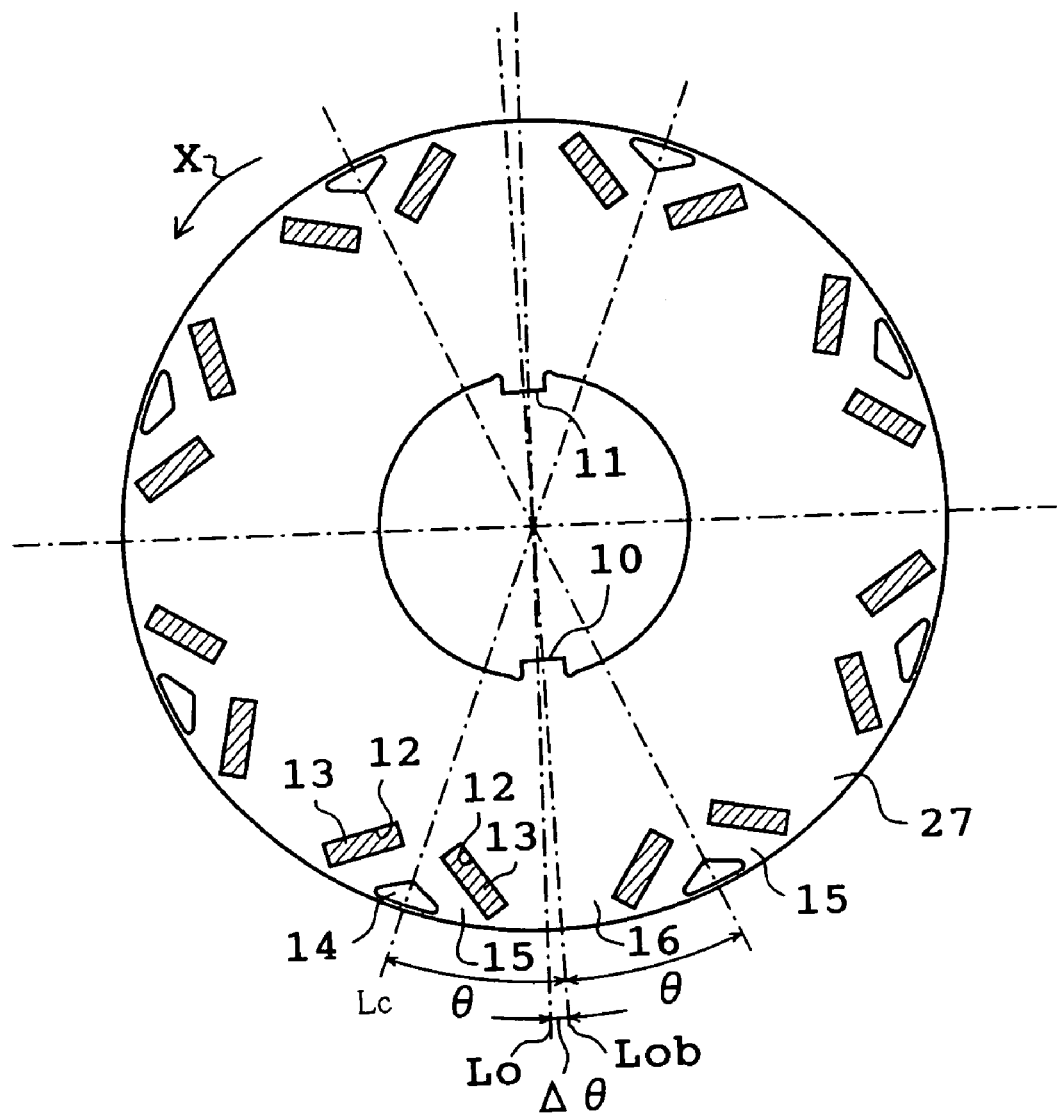
FIG. 8 is a sectional view taken along line 8—8 in FIG. 6.

FIGS. 6 to 8 illustrate a second embodiment of the invention. Describing the difference of the second embodiment from the first embodiment, the rotor core 26 employed instead of the rotor core 2 includes blocks 3 and 27 stacked alternately. Each block 27 is configured as shown in FIG. 8. This configuration is obtained by turning the silicon steel sheets of each block 4 circumferentially by 180 degrees and then stacking the sheets so that the key 10 of the block 27 shown in FIG. 1A and the key 11 of the block 27 overlap each other. The other construction of the rotor of the second embodiment is the same as that of the first embodiment.

In the construction of the second embodiment as shown in FIG. 7, too, the linear loci of the center lines Lb and Lc of the blocks 3 and 27 are zigzagged in the same manner as in the first embodiment. Consequently, the rotor of the second embodiment can achieve the same effects as those of the first embodiment.

The annular silicon steel sheets constituting the rotor core 26 are formed by punching a rolled elongated silicon steel sheet. It is well known that the rolling results in shift in the thickness in the rolling direction and in the direction perpendicular to the rolling direction. In the second embodiment, however, the blocks 27 obtained by turning the blocks 4 circumferentially by 180 degrees. Consequently, since the deviation in the thickness is absorbed, the thickness of the rotor core 26 can be rendered uniform.

The thicknesses of the four blocks 3 and 27 are equal to one another in the second embodiment. However, the total thickness of the blocks having the respective center lines Lb may be equal to the total thickness of the blocks having the respective center lines Lc.

Figure 9:
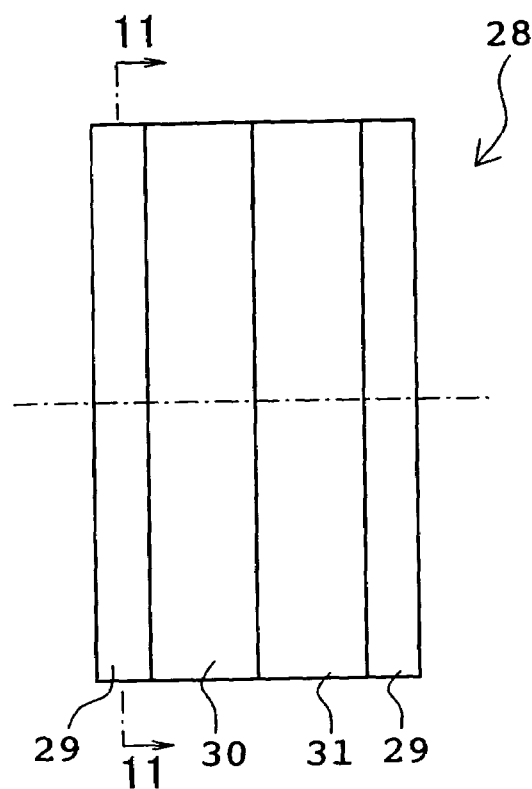
FIG. 9 is a view similar to FIG. 2, showing the rotor in accordance with a third embodiment of the invention.
Figure 10:
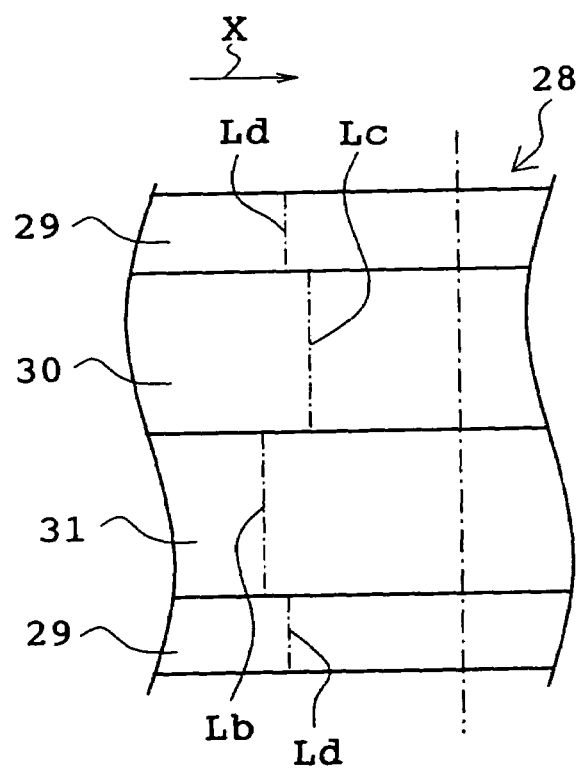
FIG. 10 is a view similar to FIG. 3.
Figure 11:
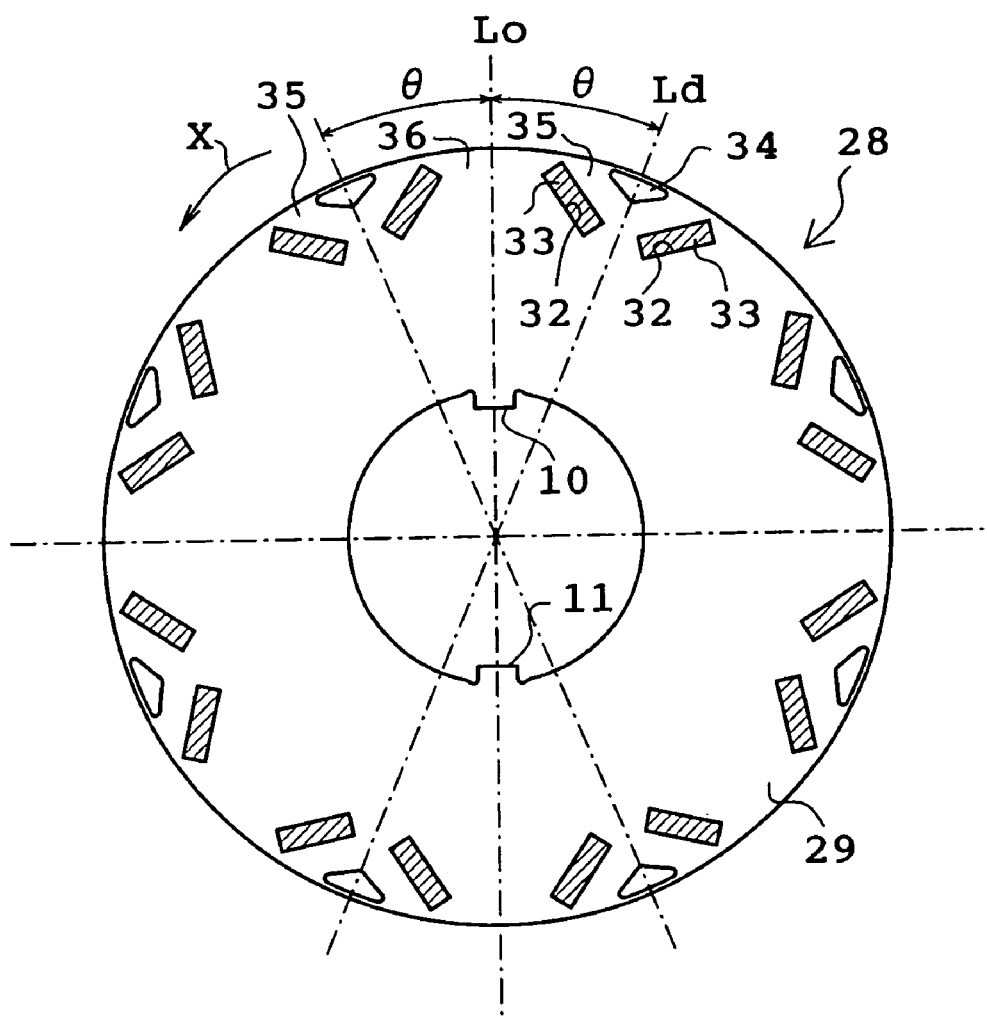
FIG. 11 is a sectional view taken along line 11—11 in FIG. 9.

FIGS. 9 to 11 illustrate a third embodiment of the invention. Describing the difference of the third embodiment from the first embodiment, the rotor core 28 employed instead of the rotor core 2 is divided into four blocks 29, 30 and 31. Each block 29 has a thickness set to be equal to or less than one half of that of each of blocks 30 and 31. The thickness of each block 29 is set at one half of that of each of the blocks 30 and 31 in the embodiment. The block 30 is formed by stacking the same silicon steel sheets as those of each block 4 (see FIG. 1B). The block 31 is formed by stacking the same silicon steel sheets as those of each block 3 (see FIG. 1A). The block 30 has a thickness equal to one of the block 31 and larger than the blocks 3 and 4. The rotor core 28 has a thickness equal to that of the rotor core 2.

Each block 29 or the silicon steel sheets composing each block 29 will be described with reference to FIG. 11. Each block 29 has a number of pairs of generally rectangular magnet insertion holes 32 which are formed in an outer circumferential portion thereof and are similar to the insertion holes 5. The permanent magnets 33 are inserted into the paired magnet insertion holes 32 respectively and fixed by an adhesive agent, filler or the like. The outer circumferential portion of each block 29 also has cavities 34 which are formed between the permanent magnets 33 of each pair and are similar to the cavities 7.

Each block 29 includes each portion thereof corresponding to the paired magnet insertion holes 32, permanent magnets 33 and cavity 34 and serving as the magnetic concave portion 35 (q axis) where a flux is difficult to pass. Each block 29 further includes each portion thereof located between the magnetic concave portion 35 and serving as a magnetic convex portion 36 (d axis) where a flux is easy to pass. The magnetic concave and convex portions 35 and 36 are formed alternately with a predetermined angle therebetween. Each block 29 further has two keys 10 and 11 which are formed on the inner circumference thereof so as to be 180-degree apart from each other and so as to extend axially.

Figures 16, 17:
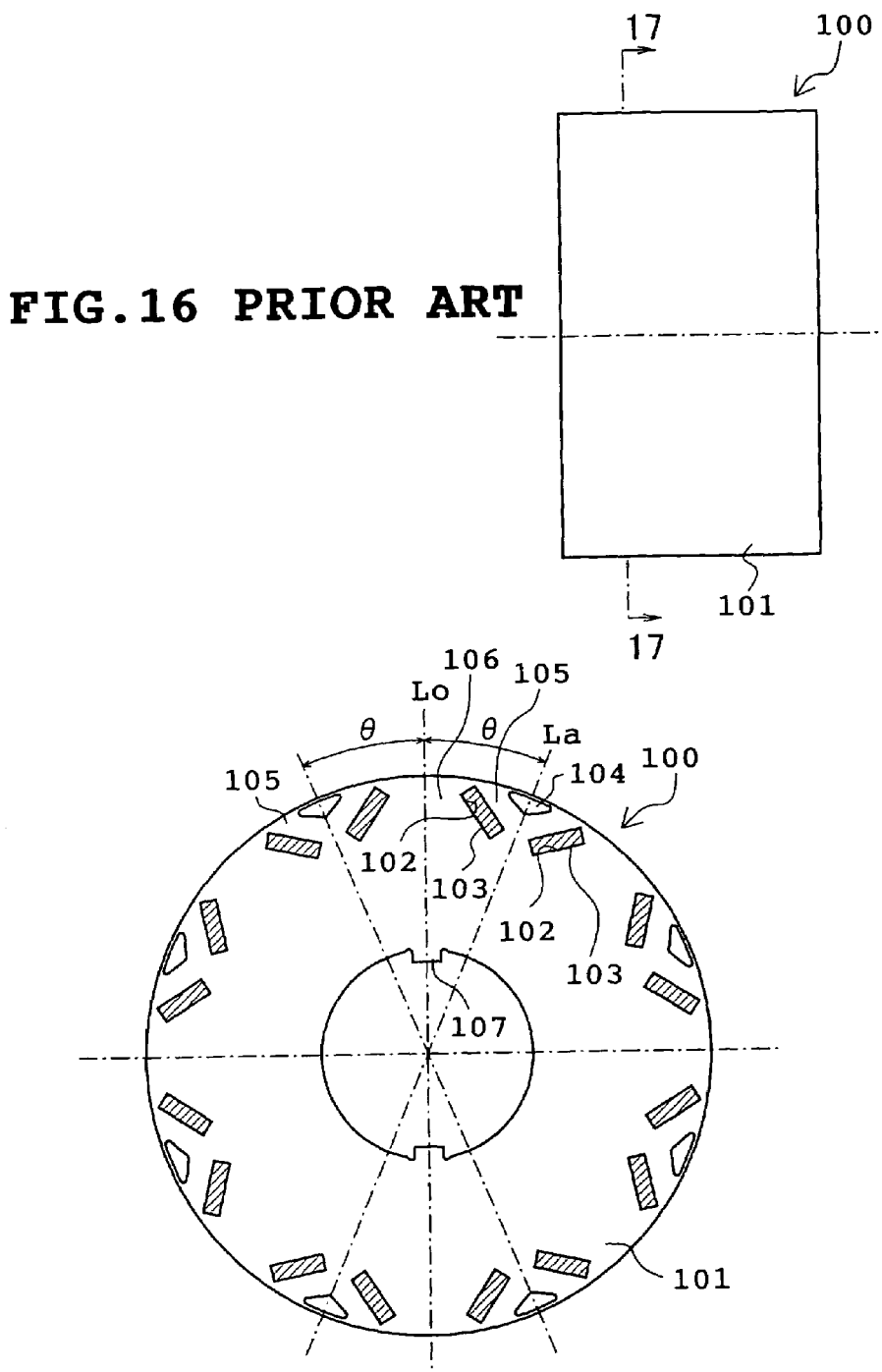
FIG. 16 is a side view of a rotor of a conventional reluctance type rotating machine with permanent magnets.
FIG. 17 is a sectional view taken along line 17—17 in FIG. 16.

The center line Lo passing the centers of the keys 10 and 11 also passes the magnetic convex portions 36 in each block 29. The center line Lo forms a predetermined angle $\theta$ with a center line Ld passing the center of the magnetic concave portion 35 adjacent to the center line Lo. The angle θ is represented as 180/n when n is the number of poles of the rotor 1. Thus, the silicon steel sheets constituting each block 29 are similar to those employed in the conventional rotor core as shown in FIG. 17.

In the above-described construction, the center lines Lb and Lc of the blocks 31 and 30 have linear loci which are zigzagged. Accordingly, the rotor can achieve the effects similar to those of skew in the rotors for squirrel-cage induction motors as in the first embodiment. In particular, the center lines Ld of the blocks 29 located at both ends of the rotor core 28 have loci are located between the loci of the center lines Lc and Lb. Accordingly, since the mechanical balance can be improved between the rotor core 28 and the stator winding, the waveform characteristic of the back electromotive force can be improved in the stator winding.

Figure 12:
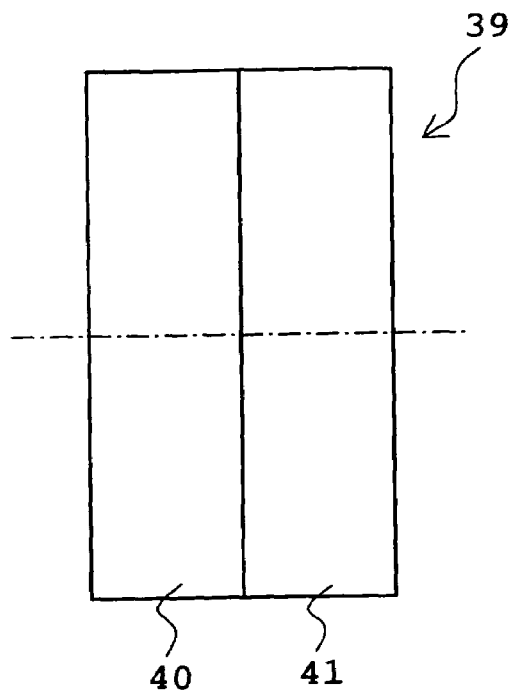
FIG. 12 is a view similar to FIG. 2, showing the rotor in accordance with a fourth embodiment of the invention.
Figure 13:
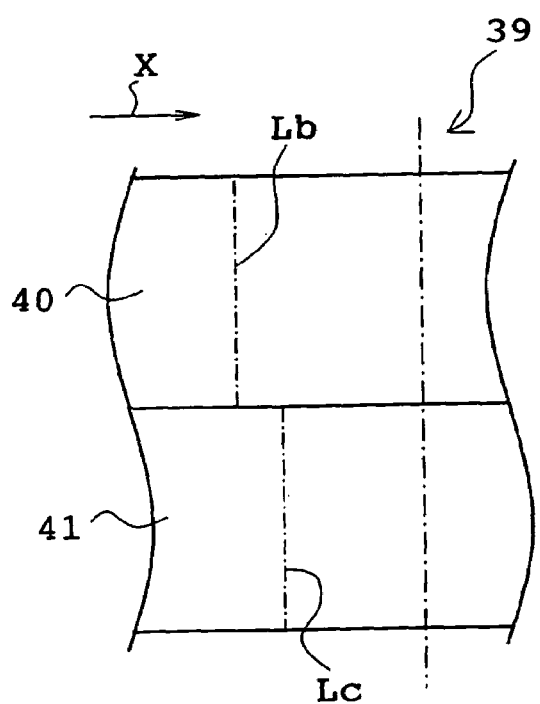
FIG. 13 is a view similar to FIG. 3.

FIGS. 12 and 13 illustrate a fourth embodiment of the invention. The difference of the fourth embodiment from the first embodiment will be described. The rotor core 39 employed instead of the rotor core 2 includes a block 40 formed by integrating the blocks 3 and a block 41 formed by integrating the blocks 4.

In the foregoing construction, the loci of the center lines Lb and Lc of the respective blocks 40 and 41 are as shown in FIG. 13. Accordingly, the fourth embodiment can achieve the same effects as those of the first embodiment.

Figure 14:
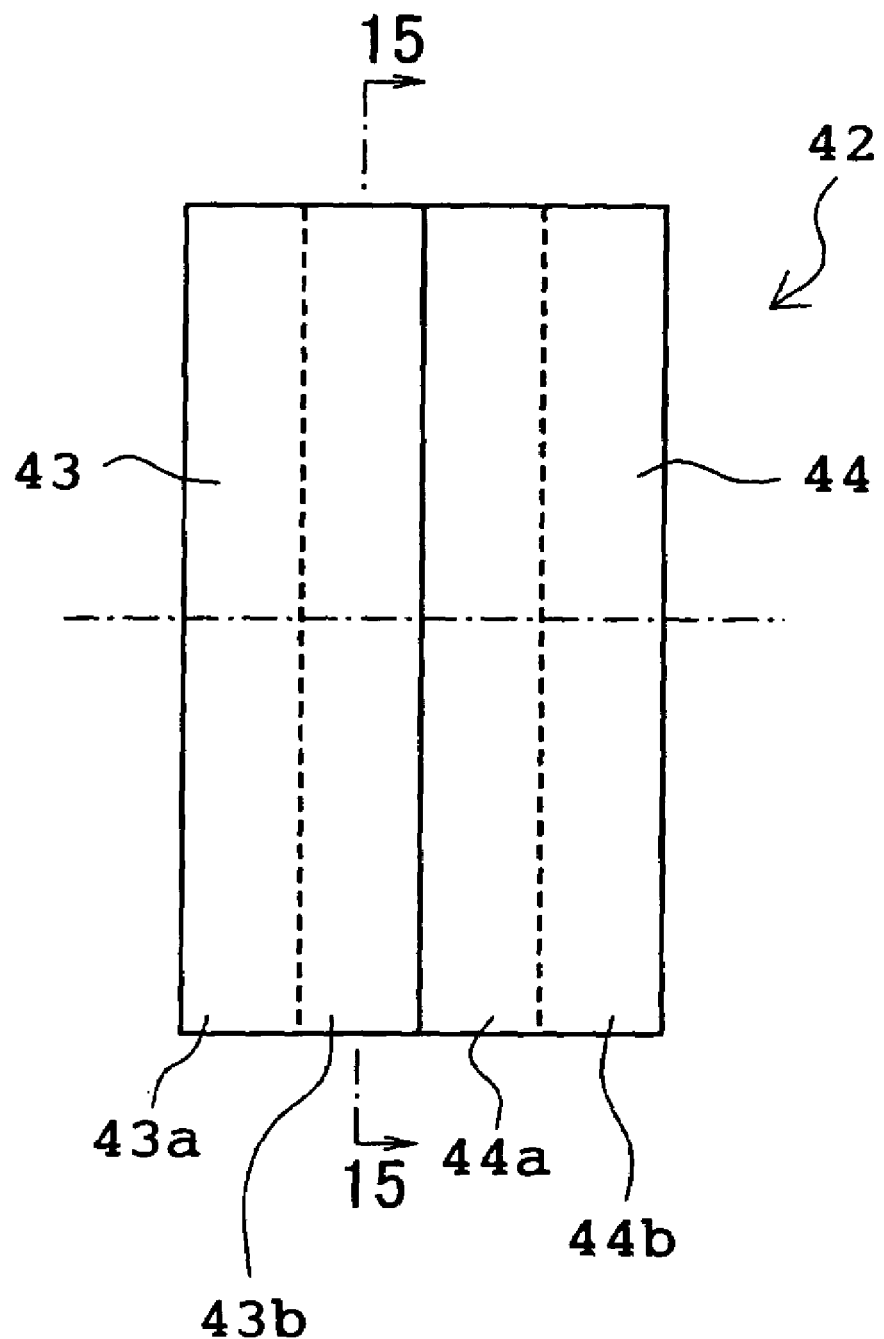
FIG. 14 is a view similar to FIG. 2, showing the rotor in accordance with a fifth embodiment of the invention.
Figure 15:
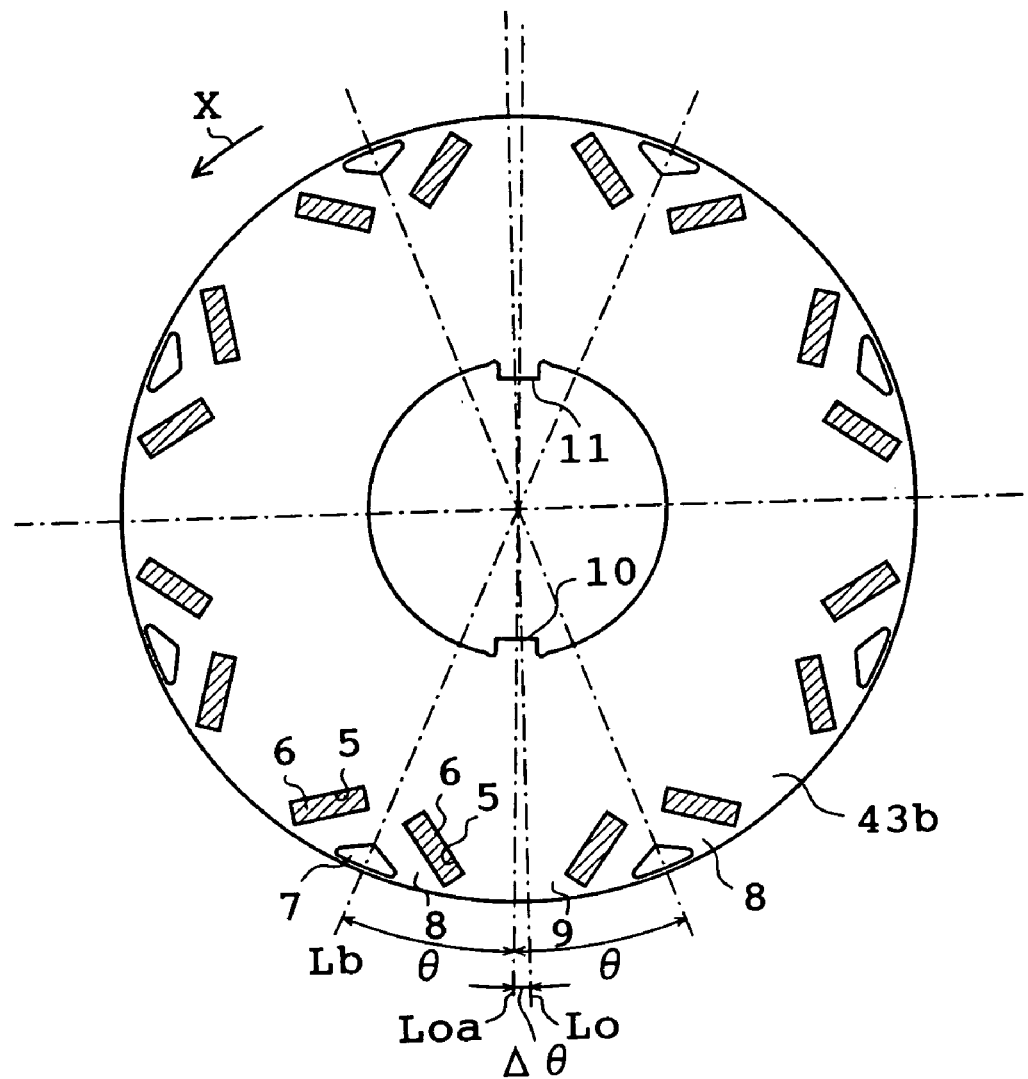
FIG. 15 is a sectional view taken along line 15—15 in FIG. 14.

FIGS. 14 and 15 illustrate a fifth embodiment of the invention. The difference of the fifth embodiment from the fourth embodiment will be described. The rotor core 42 employed in the fifth embodiment includes blocks 43 and 44. One half 44a of the block 44 is formed by stacking the silicon steel sheets (see FIG. 1B) which are the same as those of the block 41. The other half 44b of the block 44 is formed by stacking the silicon steel sheets (see FIG. 8) which are the same as those of the block 27. Furthermore, one half 43a of the block 43 is formed by stacking the silicon steel sheets (FIG. 1A) which are the same as those of the block 40. The other half 43b is formed by turning circumferentially by 180 degrees and stacking the silicon steel sheets which are the same as those of the block 40 or more specifically, by turning the portion 43a circumferentially by 180 degrees. The other construction of the rotor of the fifth embodiment is the same as that of the first embodiment. Consequently, the fifth embodiment can achieve the same effects as those of the fourth and second embodiments.

The portions 43a and 43b and the portions 44a and 44b constituting the respective blocks 43 and 44 are set at one halves of the thicknesses of the blocks 43 and 44 respectively in the fifth embodiment. However, these portions may be set substantially at one halves respectively.

The permanent magnets are provided on the rotor core in each of the foregoing embodiments. However, the permanent magnets may or may not be provided on the rotor core. Further, the generally triangular cavities are formed in the rotor core so as to compose the concave and convex portions in each of the foregoing embodiments. However, the cavities may be circular, elliptic, rectangular or rhombic. Additionally, the rotor core may have mechanical concave and convex portions formed therein so that the magnetic concave and convex portions are formed.

The number of poles of the rotor should not be limited to eight. The same effect can be achieved even when the number of poles is any other number. Furthermore, the number of slots of the stator may be set at any suitable number. Additionally, the number of blocks of the rotor should not be limited to two and four. Five or more blocks may be provided by stacking the silicon steel sheets having the magnetic concave and convex portions shifted. In this case, an amount of shift of the center line is required to be ±0.

The foregoing description and drawings are merely illustrative of the principles of the present invention and are not to be construed in a limiting sense. Various changes and modifications will become apparent to those of ordinary skill in the art. All such changes and modifications are seen to fall within the scope of the invention as defined by the appended claims.

We claim:

1. A rotor for a reluctance type rotating machine comprising:
a rotor core formed by stacking a number of annular core materials each of which includes magnetic concave and convex portions alternately formed on an outer circumference thereof and a central through hole, the rotor core having two keys which are formed at two positions on an inner circumference of the rotor core so as to extend axially, respectively, the positions being spaced 180 degrees apart from each other with respect to the rotor core, the rotor core being divided into a plurality of blocks, the core materials constituting at least one block having the magnetic concave and convex portions shifted by a predetermined angle relative to the core materials constituting the other or another block on the basis of a center line passing through the keys, wherein a whole or part of the core materials of said at least one block are located circumferentially 180 degrees apart from the corresponding core materials constituting said other or another block; and
a rotational shaft inserted through the central hole of the rotor core, the shaft having two key grooves engaging the keys of the rotor core respectively.

2. A rotor according to claim 1, wherein the core materials constituting one of at least two blocks of the rotor core have the magnetic concave and convex portions shifted by the predetermined angle in a rotating direction of the rotor relative to a center line passing through the keys, and the core materials constituting the other block of the rotor core have the magnetic concave and convex portions shifted by the predetermined angle in a direction opposite the rotating direction of the rotor relative to the center line passing through the keys.

3. A rotor according to claim 2, wherein the core materials constituting one of the two blocks are reversed inside out to be stacked into the other block.

4. A rotor according to claim 1, wherein the core materials constituting at least one of the blocks are formed so that the magnetic concave and convex portions are symmetric about the center line passing through the keys.

5. A rotor according to claim 2, wherein the core materials constituting at least one of the blocks are formed so that the magnetic concave and convex portions are symmetric about the center line passing through the keys.

6. A rotor according to claim 3, wherein the core materials constituting at least one of the blocks are formed so that the magnetic concave and convex portions are symmetric about the center line passing through the keys.

7. A rotor according to any one of claims 1 to 6, wherein each block includes the magnetic concave portions each of which is provided with a pair of magnet insertion holes which are opposed to each other so that a distance therebetween is gradually increased as the insertion holes near the outer circumference of the rotor, and permanent magnets are inserted and fixed in the insertion holes respectively.

8. A rotor according to claim 7, wherein the core materials constituting the blocks located at both ends of the rotor core are formed so that the magnetic concave and convex portions are symmetric about the center line passing through the keys.

* * * * *